US011795038B2

(12) United States Patent
Gomez Mora

(10) Patent No.: US 11,795,038 B2
(45) Date of Patent: Oct. 24, 2023

(54) CRANES AND METHODS FOR ERECTING A TOWER

(71) Applicant: General Electric Renovables Espana, S.L., Barcelona (ES)

(72) Inventor: Daniel Gomez Mora, Barcelona (ES)

(73) Assignee: General Electric Renovables Espana, S.L., Barcelona (ES)

(*) Notice: Subject to any disclaimer, the term of this patent is extended or adjusted under 35 U.S.C. 154(b) by 59 days.

(21) Appl. No.: 17/102,498

(22) Filed: Nov. 24, 2020

(65) Prior Publication Data
US 2021/0155460 A1 May 27, 2021

(30) Foreign Application Priority Data

Nov. 26, 2019 (EP) ..................................... 19383047

(51) Int. Cl.
*B66C 23/20* (2006.01)
*B66C 23/32* (2006.01)
(Continued)

(52) U.S. Cl.
CPC ............ *B66C 23/207* (2013.01); *B66C 23/32* (2013.01); *B66C 23/185* (2013.01); *B66C 23/305* (2013.01); *B66C 23/72* (2013.01)

(58) Field of Classification Search
CPC ... B66C 23/185; B66C 23/207; B66C 23/305; B66C 23/32
See application file for complete search history.

(56) References Cited

U.S. PATENT DOCUMENTS 8,584,801 B2 11/2013 Baxter
9,016,029 B2 4/2015 Wagner
(Continued)

FOREIGN PATENT DOCUMENTS

CN 101590982 A 12/2009
CN 103130106 B 1/2016
(Continued)

OTHER PUBLICATIONS

European Search Report Corresponding to EP19383047 dated May 19, 2020.
(Continued)

*Primary Examiner* — Sang K Kim
*Assistant Examiner* — Nathaniel L Adams
(74) *Attorney, Agent, or Firm* — Dority & Manning, P.A.

(57) ABSTRACT

The disclosure relates to a crane (200) for erecting a tower including a plurality of tower segments (171, 72, 173, 174, 175), the crane (200) comprising: a telescopic mast (210), and a jib (230) rotatably mounted with respect to the telescopic mast (210) and comprising lifting equipment (240). The telescopic mast (210) comprises a lower mast segment (211) having one or more lower clamp assemblies (202, 204) for selectively gripping portions of the tower and a roller assembly (300) for rolling along the tower, and comprising one or more further mast segments (212, 213, 214, 215, 216) having an upper clamp assembly (206) for selectively gripping portions of the tower, the further mast segments (212, 213, 214, 215, 216) being slidable with respect to the lower mast segment (211). The disclosure also relates to methods for climbing a tower with a crane (200) and methods for mounting a wind turbine tower.

15 Claims, 13 Drawing Sheets

(51) Int. Cl.
    *B66C 23/18* (2006.01)
    *B66C 23/30* (2006.01)
    *B66C 23/72* (2006.01)

(56) References Cited

U.S. PATENT DOCUMENTS

| | | | |
|---|---|---|---|
| 9,238,923 | B2 | 1/2016 | Arlaban Gabeiras et al. |
| 9,376,291 | B2 | 6/2016 | Laurens et al. |
| 9,394,880 | B2 | 7/2016 | Zuteck |
| 9,403,665 | B2 | 8/2016 | Herse |
| 9,651,020 | B2 | 5/2017 | Holloway et al. |
| 9,850,880 | B2 | 12/2017 | Puls |
| 2003/0183594 | A1 | 10/2003 | Torres Martinez |
| 2016/0258421 | A1 | 9/2016 | Agassi |
| 2018/0155160 | A1 | 6/2018 | Nelson |
| 2018/0282134 | A1 | 10/2018 | Lagerweij et al. |
| 2019/0219035 | A1* | 7/2019 | Garcia De La Pena ............... F03D 80/50 |

FOREIGN PATENT DOCUMENTS

| | | |
|---|---|---|
| CN | 105366566 A | 3/2016 |
| CN | 105439005 A | 3/2016 |
| CN | 104891307 B | 3/2017 |
| CN | 105439005 B | 6/2017 |
| CN | 107311051 A | 11/2017 |
| CN | 207046724 U | 2/2018 |
| CN | 108821133 A | 11/2018 |
| DE | 19647515 A1 | 5/1998 |
| DE | 19741988 A1 | 4/1999 |
| EP | 2 746 571 A2 | 6/2014 |
| EP | 3 517 776 A1 | 7/2019 |
| IN | 201308914 P4 | 12/2014 |
| NL | 2003170 C | 1/2011 |
| NL | 2017381 B1 | 3/2018 |
| WO | WO 2009/080047 A2 | 7/2009 |
| WO | WO 2015/114573 A1 | 8/2015 |
| WO | WO2017/055598 A1 | 4/2017 |
| WO | WO2018/132010 A1 | 7/2018 |
| WO | WO2018/164571 A1 | 9/2018 |

OTHER PUBLICATIONS

Grupousabiaga, gtk1100, Jan. 29, 2010. (YouTube Video Web Link) https://www.bing.com/videos/search?q=GTK1100&view=detail&mid=43C237D2FC16D96A7BC143C237D2FC16D96A7BC1&FORM=VIRE.

kritor.net, SLJ900 32 Bridge Girder Erection Mega Machine Original, Oct. 19, 2015. (YouTube Video Web Link) https://www.youtube.com/watch?v=AHY7iKWuB1U&feature=youtu.be.

RC Video, RC Crane: Bridge Building with SLJ900 Bridge Girder, XXL RC Construction Site, Road Work, Sep. 27, 2016. (YouTube Video Web Link) https://www.youtube.com/watch?v=g6cme45PgPc.

\* cited by examiner

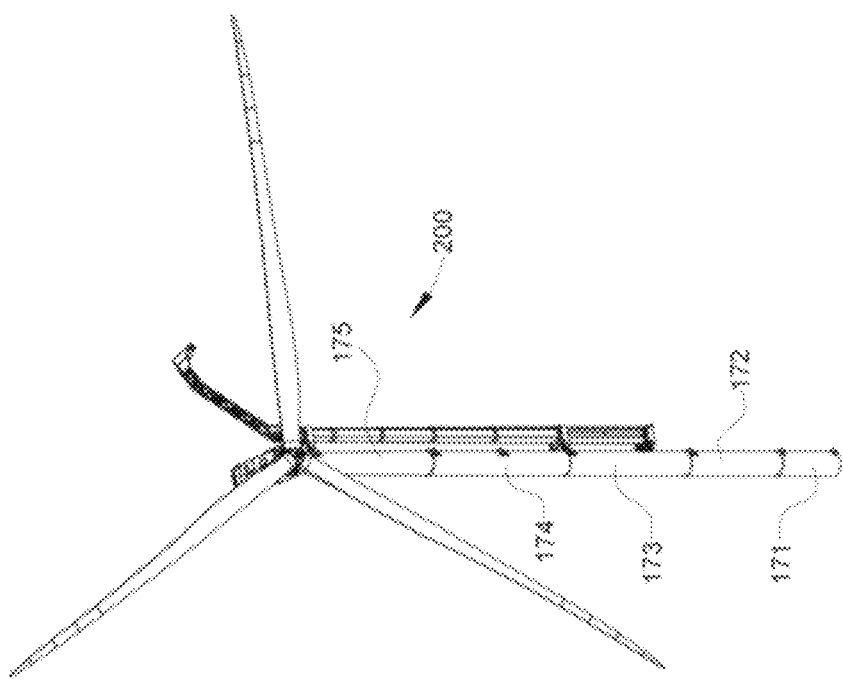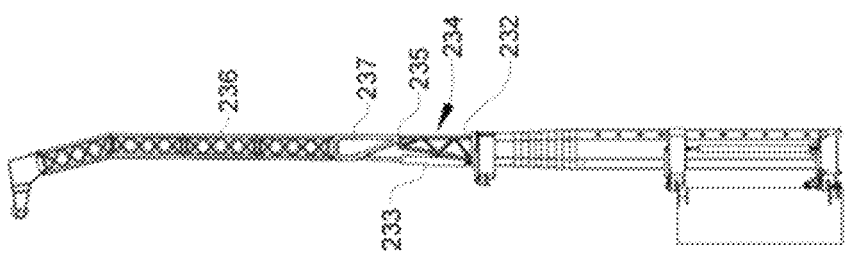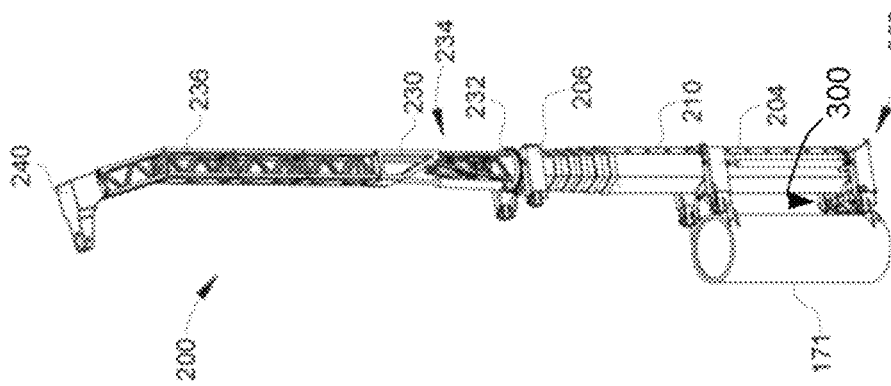

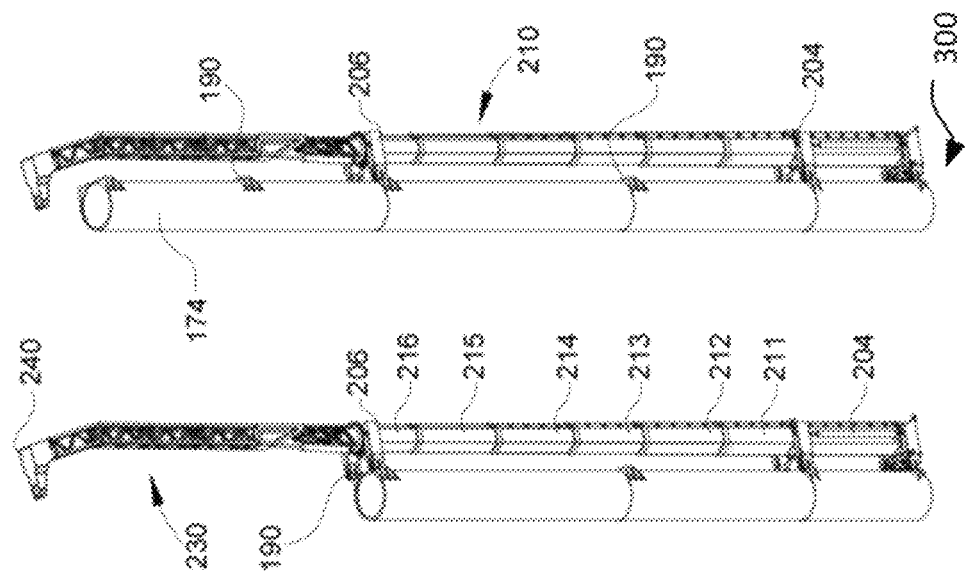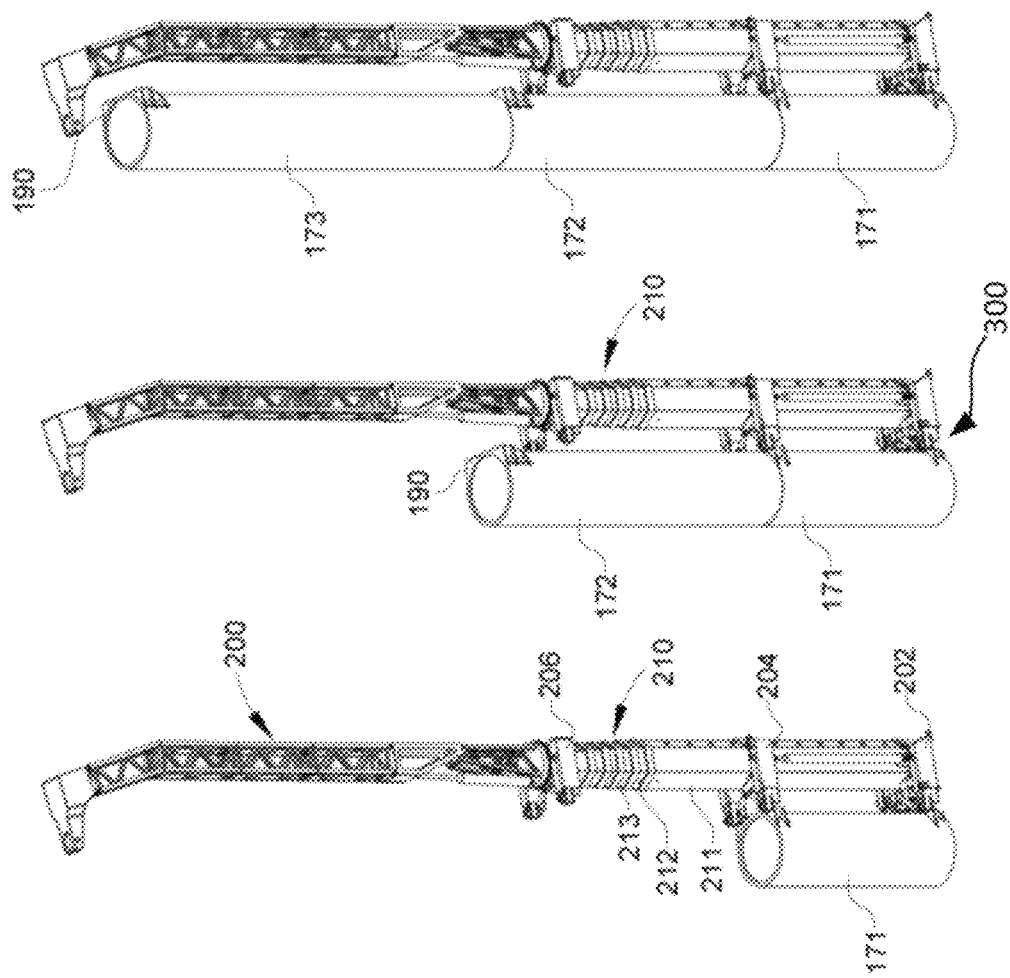

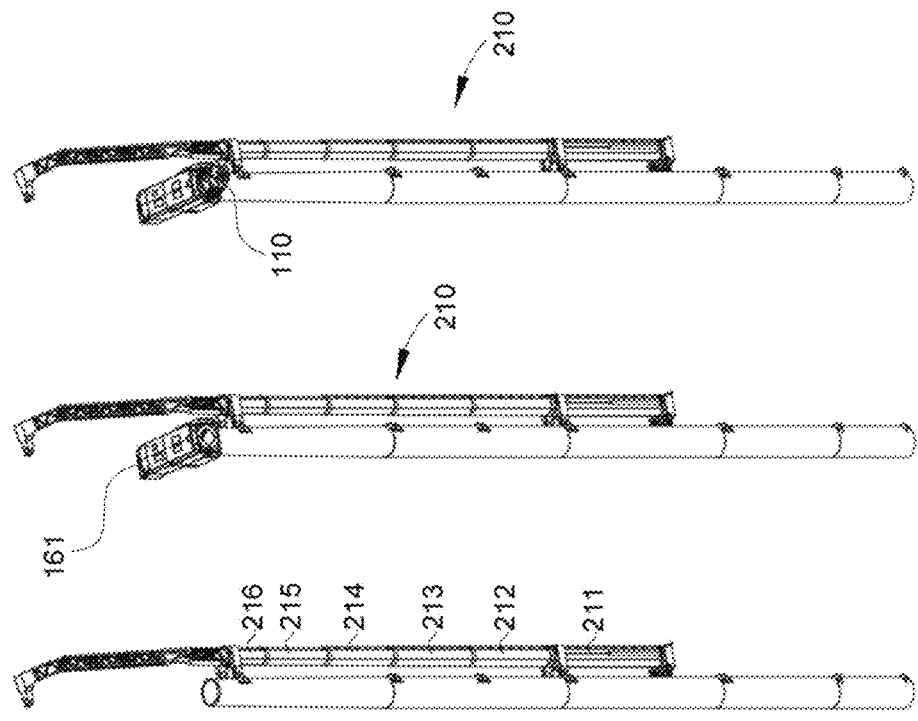
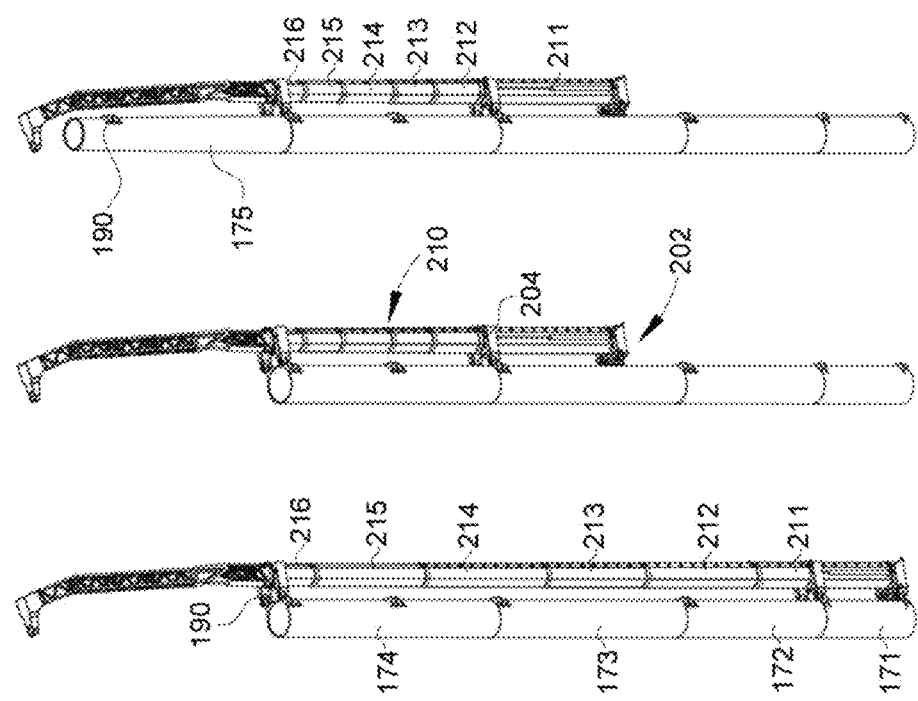

CRANES AND METHODS FOR ERECTING A TOWER

The present disclosure relates to cranes for erecting a tower including a plurality of tower segments. And in particular, the present disclosure relates to cranes for erecting a wind turbine tower. The present disclosure further relates to methods for cranes climbing a tower and to methods for erecting a wind turbine tower.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

A known way of mounting a wind turbine includes the steps of transporting the different elements to the site of the wind turbine. A wind turbine tower may typically comprise a plurality of tower segments which are mounted or stacked on top of each other. The tower segments may be joined to each other at tower flanges.

A large crane may be used to hoist subsequent tower segments and stack them on top of each other. After assembling the tower segments, the wind turbine nacelle may be lifted with the same large crane and can be mounted on top of the tower. Then the wind turbine rotor hub can be lifted with the crane and mounted to a rotor shaft and/or the nacelle.

Additionally, one or more blades are mounted to the wind turbine rotor hub. The rotor hub generally comprises a plurality of annular mounting flanges with openings. The blade can comprise a plurality of fasteners, such as bolts, or pins or studs at its blade root. During installation, these fasteners are to be fitted into the openings in the mounting flanges.

It is also known to hoist a complete rotor assembly, i.e. the hub with the plurality of blades, and mount it to e.g. the nacelle. But in order to mount a complete rotor assembly, a large surface area is required, which is typically not available e.g. in the case of offshore wind turbines.

It is further known to mount an incomplete rotor assembly on the nacelle, e.g. the hub with two blades and subsequently, mount the remaining blade. In these cases, the rotor with the two blades is normally mounted with the two blades pointing upwards, i.e. "bunny ears" configuration. There is thus no need for rotating the wind turbine rotor as the third blade could be vertically mounted from below. However, in order to be able to perform these operations, the prevailing wind speed has to be below a predetermined value for a prolonged period of time. The period of time depends on the expected length of the installation step and a safety factor to be taken into account.

It is also known to mount each of the plurality of blades in a substantially horizontal orientation or in a substantially vertical orientation. This means that individual installation steps may require less time and may be performed at higher winds, thus increasing the time windows available for installation.

Typically, to install a blade onto the wind turbine hub, the large crane previously used to install e.g. the tower, the nacelle and the rotor hub can be operated in order to raise the blade relative to the rotor hub. Unfortunately, it is expensive to operate such large cranes. In fact, the costs of employing such large cranes currently accounts for a significant portion of the overall costs associated with wind turbine installations. For offshore applications, special vessels carrying large cranes are required.

There is a clear tendency in the field to increase the size of the wind turbines. The wind turbine towers are built increasingly higher and the blades become increasingly longer. E.g. current tower designs are over 80 m, 100 m or even over 120 meters high. The weight of wind turbine components such as blades, nacelle, and rotor hub increases as well with an increase in size.

In order to mount tower segments on top of each other, and subsequently hoist a nacelle etc. ever larger cranes are required. Moreover, increasing counterweights are required for these large cranes.

There is a plurality of disadvantages related to the use of large cranes. Platform or pads for the cranes increase with an increase in size of the cranes. Transportation of crane components becomes increasingly complex and expensive. And large cranes are more sensitive to wind loads as well.

In view of these disadvantages, self-hoisting or self-climbing cranes have been proposed. Such self-climbing cranes offer several potential advantages including e.g. easier transportation of the crane, and regardless of the height of the tower the length of the crane does not need to be increased. The hoisting structure attached to a tower will also be less sensitive to wind loads. Also, using such self-hoisting or climbing cranes, the surface area required for installation stays substantially the same regardless of the height of the tower.

WO 2018/132010 discloses a method for onshore or offshore erecting an upstanding construction comprising longitudinal construction parts, in particular parts of a windmill. In this prior art document, each of the tower segments carries a guide facility which is depicted as rails. A crane can be guided along the rails.

US 2018/0282314 discloses a hoisting system for the installation of a wind turbine wherein said hoisting system comprises measures to achieve a load bearing connection to the tower of the wind turbine and comprises measures to move the hoisting system up and down along the tower wherein the hoisting system, when it is fixed to an already installed part of the wind turbine tower with said load bearing connection, is arranged to install or remove any of a tower segment, a nacelle, a generator, a hub, and a blade in one or more combined hoists or in a single hoist.

Examples of the present disclosure provide methods and systems for erecting a tower, and particularly wind turbine towers, which have reduced complexity and/or require less modifications in the tower structure. Examples provide methods and systems for erecting wind turbines.

SUMMARY

In a first aspect of the present disclosure, a crane for erecting a tower including a plurality of tower segments is provided. The crane comprises a telescopic mast, and a jib rotatably mounted with respect to the telescopic mast and comprising lifting equipment. The telescopic mast comprises a lower mast segment having one or more lower clamp assemblies for selectively gripping portions of the tower and a roller assembly for rolling along the tower. The telescopic mast also comprises one or more further mast segments having an upper clamp assembly for selectively gripping portions of the tower, the further mast segments being slidable with respect to the lower mast segment.

In accordance with this aspect, a crane is provided with a telescopic mast. The roller assembly guides the telescopic mast as it is retracted or extended. Moreover, mast segments of the telescopic mast guide each other due to the telescopic structure. The crane can move upwards (and downwards) with respect to the tower, without a specific rail or guide structure on the outside of the tower.

In a further aspect, a method for climbing a tower with a crane is provided. The method comprises positioning a first tower segment and attaching a crane having a telescopic mast to the first tower segment by a lower clamp assembly gripping a pad on an outside of the first tower segment. The method further comprises stacking one or more further tower segments on top of the first tower segment and an upper clamp assembly of the telescopic mast gripping a pad on an outside of one of the further tower segments. The method then comprises releasing the lower clamp assembly and retracting the telescopic mast from an at least partially extended state, whereby a roller assembly of a lower mast segment rolls along an outside of the first tower segment.

In yet a further aspect, a method for erecting a wind turbine tower is provided. The method comprises positioning a bottom tower segment, and attaching a crane including a telescopic mast to the bottom tower segment by a bottom clamp assembly of a lower mast segment gripping a bottom mount at an outside of the bottom tower segment and an intermediate clamp assembly of the lower mast segment gripping a further mount at the outside of the bottom tower segment. The method then comprises hoisting one or more further tower segments using the crane and mounting the further tower segments on top of the bottom tower segment to build a tower segment stack and telescopically extending the telescopic mast. The method then comprises an upper clamp assembly of a further mast segment gripping a mount at an outside of one of the further tower segments and releasing the bottom clamp assembly.

BRIEF DESCRIPTION OF THE DRAWINGS

FIGS. 3A-3C schematically illustrate an example of a crane mounted on a tower segment and on a wind turbine;

DETAILED DESCRIPTION OF EXAMPLES

Figure 1:
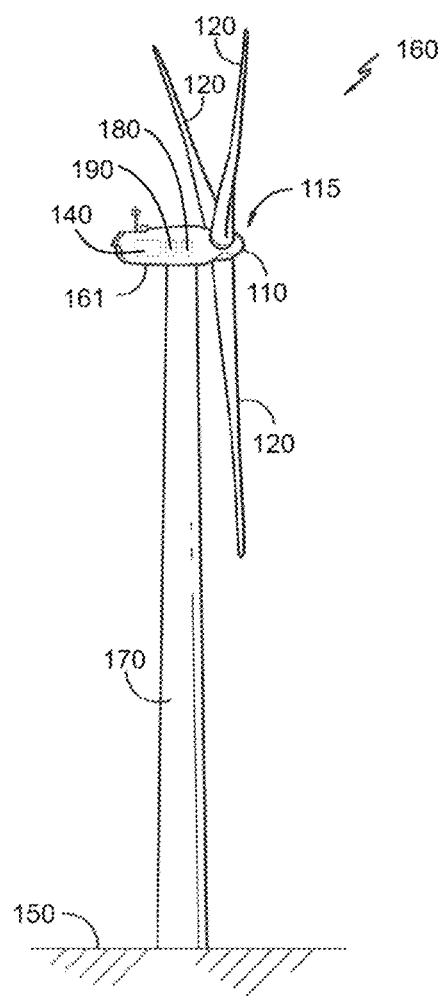
FIG. 1 illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
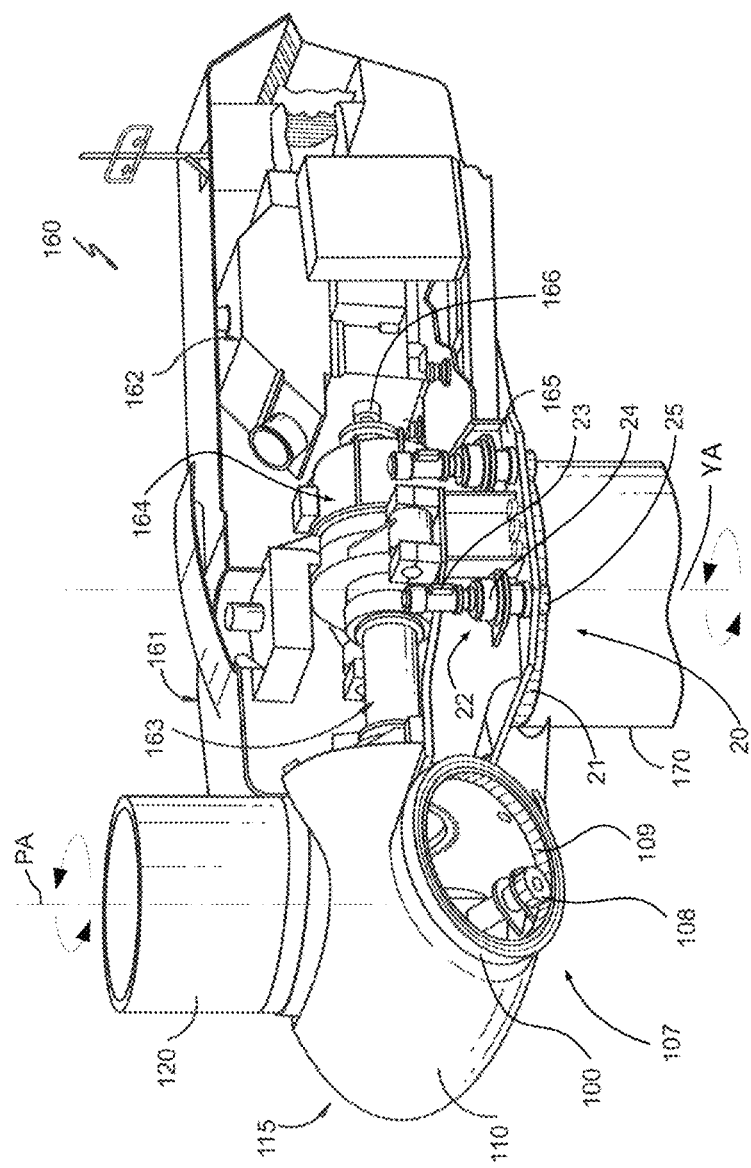
FIG. 2 illustrates a simplified, internal view of one example of the nacelle of the wind turbine of the FIG. 1.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a yaw axis YA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis PA.

FIGS. 3A-3C schematically illustrate an example of a crane 200 mounted on a tower segment 171 and on a wind turbine. A crane 200 for erecting a tower including a plurality of tower segments 171-175 is disclosed. The crane 200 comprises a telescopic mast 210, and a jib 230 rotatably mounted with respect to the telescopic mast 210 and comprising lifting equipment 240.

The telescopic mast 210 comprises a lower mast segment having one or more clamp assemblies 202, 204 for selectively gripping portions of the tower and a roller assembly 300 for rolling along the tower, and further comprises one or more further mast segments having an upper clamp assembly 206 for selectively gripping portions of the tower, the further mast segments being slidable with respect to the lower mast segment.

In particular, the telescopic mast may be configured to change between a retracted state and one or more extended states, and the telescopic mast 210 may be configured to climb the tower by selectively releasing the upper clamp assembly 206 or the lower clamp assemblies 202, 204 and changing between the retracted and the extended states. This will be further illustrated herein.

A retracted state of the telescopic mast may herein be understood to refer to a state of the telescopic mast which is fully retracted i.e. the mast segments are slid into each other to substantially the maximum extent possible and the telescopic mast is at its minimum length. An extended state may herein be understood to be a partially extended state or a fully extended state. A fully extended state is the state in which the mast segments have slid out of each other substantially to the maximum extent possible. At the fully extended state, the telescopic mast is at its maximum length. A partially extended state may be understood herein to refer to any state of configuration of the mast that is not fully extended or fully retracted.

In the situation of FIG. 3A, a tower segment 171 is shown. The tower segment may be a segment of a wind turbine tower. In other examples, other towers may be erected in accordance with the systems and methods disclosed herein.

In FIG. 3A, the lower clamp assembly is gripping a portion of tower segment 171, and in particular a portion on an outside from the tower segment 171. The telescopic mast comprises a plurality of segments (illustrated particularly in FIG. 4) which are slidable with respect to each other. The telescopic mast can increase its length by extending the telescopic mast, and the mast segments sliding away from the lower mast segment. The telescopic mast can then decrease its length by retracting the segments.

As the telescopic mast retracts and extends to climb the tower (and after installation to descend the tower), the released clamp assemblies move with the moving mast segment, i.e. there is no relative movement of a mast segment with respect to its clamp assembly or clamp assemblies. Because there is no such relative movement, no complex braking mechanisms are required.

The telescopic mast may include one or more hydraulic mechanisms for extending and retracting the telescopic mast. The telescopic mast may further include locking mechanism to lock the mast segments in different positions such that a length of the telescopic mast can be temporarily fixed.

The jib 230 in this example comprises a base plate 232 which may be rotatably mounted with respect to the upper mast segment of the telescopic mast. The jib 230 may further comprise a base 234 including a hydraulic actuator 233 which can tilt upper part 237 of base 230. Upper part 237 which carries the boom 236 of jib 230 is hingedly mounted (hinge 235) with respect to base 230.

Jib 230 comprises lifting equipment. For example, at or near a distal end of jib 230, (part of) suitable lifting equipment 240 may be provided. The lifting equipment may include a hoisting mechanism and a plurality of pulleys. A hoist may be positioned in other locations of jib 230. In one example, pulleys and rollers may be provided inside boom 236, and a hoist may be provided on top of base 230.

FIG. 3C illustrates the same crane 200 mounted on a completed wind turbine with a telescopic mast in a fully extended state. The tower may comprise a plurality of further segments 172-175, including an upper mast segment 175 and one or more intermediate segments 172-174.

In the example of FIG. 3, the upper mast segment includes the upper clamp assembly 206, and specifically the upper clamp assembly 206 may be arranged at or near an upper end of the upper mast segment. In the example of FIG. 3, the upper clamp assembly 206 is attached to upper tower segment 175.

Figure 4M:
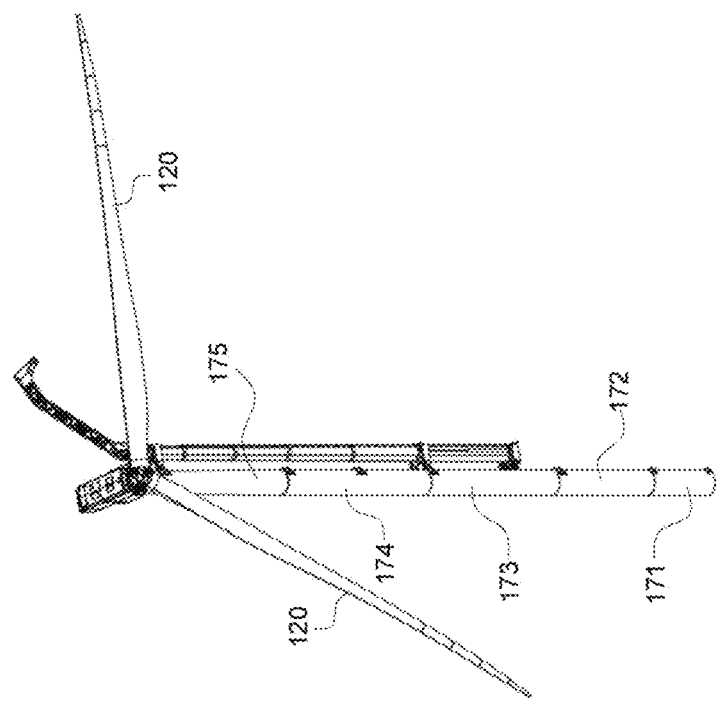
FIGS. 4A-4N schematically illustrates a sequence of steps according to an example of a method for installing a wind turbine.
Figure 4L:
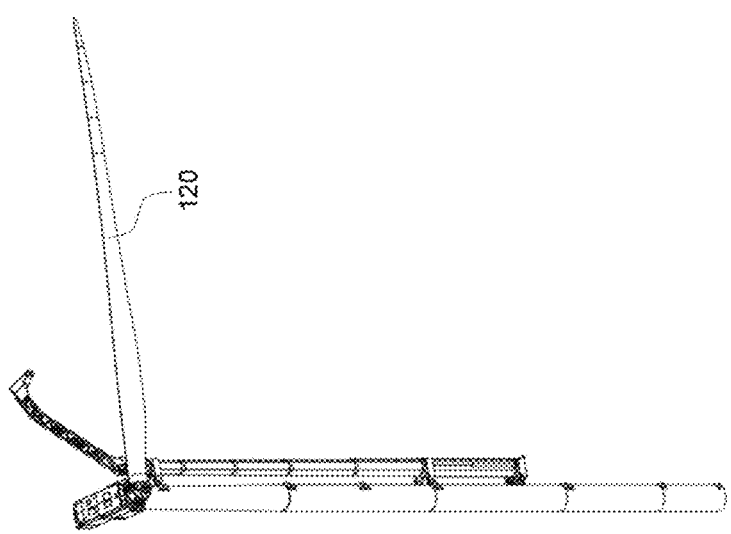
Figure 4N:
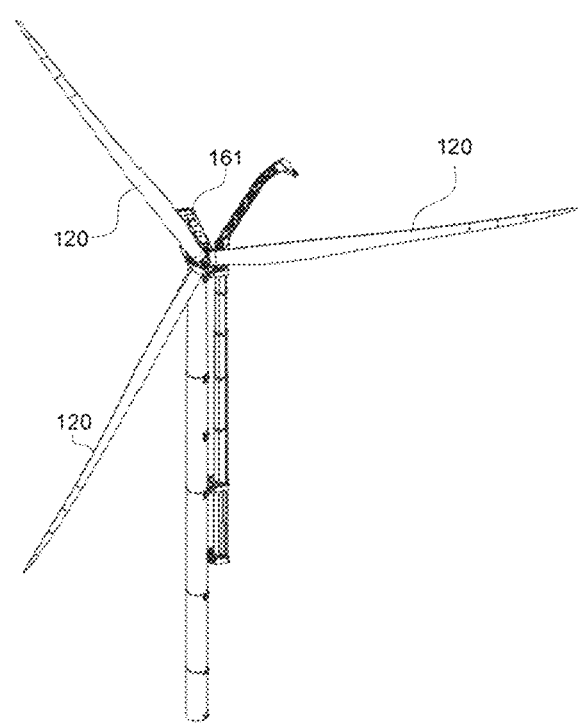

FIGS. 4A-4N schematically illustrate a sequence of steps according to an example of a method for installing a wind turbine tower and a wind turbine.

An example of a method for erecting a wind turbine tower is illustrated in FIG. 4. The method comprises positioning a bottom tower segment 171. A crane 200 including a telescopic mast 210 is attached to the bottom tower segment 171 by a bottom clamp assembly 202 of a lower mast segment 211 gripping a bottom mount at an outside of the bottom tower segment 171. The crane 200 is also attached by an intermediate clamp assembly 204 of the lower mast segment 211 gripping a further mount at the outside of the bottom tower segment.

An example of attaching the crane 200 to the bottom tower segment 171 is illustrated in FIG. 7 and will be described in further detail with reference to FIG. 7.

The method may further comprise hoisting one or more further tower segments 172, 173 using the crane 200 and mounting the further tower segments 172, 173 on top of the bottom tower segment 171 to build a tower segment stack. This may be seen in FIGS. 4B and 4C. In order to hoist the tower segments, the jib may be rotated and lifting equipment on the jib may be used for lifting a tower segment from the floor and placing it on top of previously installed stack of segment. The individual tower segments may be attached to each other e.g. with bolts at mounting flanges.

The method may further comprise telescopically extending the telescopic mast 210. This may be seen in FIG. 4D. An upper clamp assembly 206 of a further mast segment may grip a mount 190 at an outside of one of the further tower segments. The bottom clamp assembly 202 may then be released.

Even if the bottom clamp assembly 202 is released, a secure attachment may still be maintained through intermediate clamp assembly 204 and upper clamp assembly 206.

In examples, such as shown in FIGS. 4D and 4E, the method may further comprise hoisting a further tower segment 174 using the crane 200 after releasing the bottom clamp assembly 202 and mounting the further tower segment 174 on top of the tower segment stack.

In the situation of FIG. 4E, the telescopic mast 210 is not completely extended yet. In a next step of this example, the telescopic mast 210 may be further extended. Prior to this further extension, upper clamp assembly 206 may be released. After increasing the length of the telescopic mast, the upper clamp assembly may grip a mount 190 at tower segment 174.

In examples, the bottom clamp assembly 202, intermediate clamp assembly 204 and upper clamp assembly 206 may grip the tower at the same time. For hoisting tower segments, in most occasions, two clamp assemblies will be sufficient. In order to increase stability, all shown clamp assemblies may be activated at the same time.

In the situation of FIG. 4F, the telescopic mast may be substantially completely extended. The intermediate clamp assembly 204 is attached at lower tower segment 171, and the upper clamp assembly is attached at a mount 190 in the fourth tower segment. In this situation, the telescopic mast cannot be further extended. In order to mount further tower segments and other wind turbine components, the crane may climb the tower.

In an aspect, a method for climbing a tower with a crane 200 is provided. The method comprises positioning at least a first tower segment 171; attaching a crane 200 having a telescopic mast 210 to the first tower segment 171 by a lower clamp assembly gripping a pad (or mount) 190 on an outside of the first tower segment 171; and stacking one or more further tower segments 172-174 on top of the first tower segment 171.

An upper clamp assembly 206 of the telescopic mast may then grip a pad 190 on an outside of one of the further tower segments. Then, the lower clamp assembly may be released and the telescopic mast 210 may be retracted (FIG. 4G) from an at least partially extended state, whereby a roller assembly 300 of a lower mast segment 211 rolls along an outside of the first tower segment 171 (and optionally along further tower segments 172, 173).

As the telescopic mast is retracted from a fully or partial extended state to a more retracted state, the lower mast segments 211-214 are guided by higher segments 215, 216 because of the telescopic structure of mast 210. The roller assembly 300 may roll up the tower without the need for any fixed guides or rails on the tower. The method may therefore be carried out "guideless" and on towers which do not have any guiding structure on their outside. There is also no need for locking or braking mechanisms for the roller assembly 300.

A lower clamp assembly may herein refer to the bottom clamp assembly 202 and/or to the intermediate clamp assembly 204.

In some examples, a single hydraulic cylinder may be used for extending the various mast segments. This may lead to a reduced weight. In other examples, a plurality of hydraulic cylinders may be used, e.g. one for each mast segment.

The segments of the mast may be locked in different positions. After extending or retracting the mast to a desired length, the segments may be locked in respective positions such that the length is maintained without providing hydraulic pressure.

In one example, a total length of the mast of the crane may be between 60 and 85 meters, specifically between 70 and 80 meters. In an example, the mast may have five segments. The segments may be between 20 meters and 10 meters in length. In examples, the lower mast segment may be longer than subsequent mast segments. In examples, the length of the mast segments decreases with each higher mast segment.

In some examples, the method may further comprise a lower clamp assembly (here the intermediate clamp assembly 204) of the telescopic mast 210 gripping a pad 190 on an outside of one of the further tower segments, e.g. pad 190 arranged near an upper end of tower segment 173. Pads or mounts 190 may protrude from the tower segments.

In the illustrated example, a further tower segment 175 may be hoisted by crane 200 and placed on top of the stack. Then, in some examples, the method may further comprise releasing the upper clamp assembly 206, extending the telescopic mast 210 and the upper clamp assembly 206 gripping another pad 190 protruding from one of the further tower segments (in FIG. 4I, pad 190).

Then, the FIGS. 4J-4N schematically illustrate how further components of the wind turbine may be hoisted using the same lifting equipment of crane 200. In FIG. 4J, a nacelle 161 has been placed on top of the wind turbine tower. A yaw bearing may be provided between tower and nacelle 161. Subsequently, a hub 110 may be hoisted and attached at an upwind side of the nacelle 161. This is illustrated in FIG. 4K.

Then, the blades 120 may be hoisted one after another. A first blade 120 is attached in a substantially horizontal manner as may be seen in FIG. 4L. The blade 120 may be attached to hub 110 through a pitch bearing. After installation of the first blade, the hub 110 may be rotated, such that the subsequent blade 120 can be installed (FIG. 4M). After installation of the second blade 120, the hub may be rotated again so that the third blade may also be installed in a substantially horizontal orientation.

Rotation of the hub may involve the use of an additional tool. Such an additional tool may drive a shaft of a gearbox. Also, the crane and a suitable gripping assembly for the blade may be used to rotate the hub.

Even though in this example the blades were installed separately from the hub and all blades were installed horizontally, it should be clear that in other examples other installation procedures may be used. It is possible to hoist a hub with one or more pre-installed blades. It is also possible to mount a blade at a position of e.g. +30° or −30° with respect to a horizontal plane.

It should furthermore be clear that suitable hoisting equipment may be used which may be partially or completely internal or external to crane 200. E.g. in one example a gripping unit that grips a blade close to a centre of gravity may be hoisted. In other examples, slings may be used. Suitable attachments for the hoisting may be provided for the different components. These may be different for the nacelle than for the hub and for the blades.

In this particular example, five tower segments are stacked on top of each other, but in other examples a different number of tower segments may be used. Also, in other examples, the lengths of the different tower segments may be varied and the shape of the tower segments may be varied.

After installation of a tower, of a wind turbine tower or a complete wind turbine, the telescopic mast may descend the tower. Descending the tower may also comprise selectively releasing clamp assemblies and suitable extension and retraction of the telescopic mast, in a manner substantially opposite to the methods for climbing.

FIGS. 5A-5D schematically illustrate an example of a roller assembly 300 and bottom clamp assembly 202 that may form part of a crane 200 according to examples of the present disclosure. The lower end of the lower mast segment in this example may combine rollers or wheels for rolling along a tower and a bottom grip for gripping a portion of the tower, as has been illustrated e.g. in FIG. 4.

The roller assembly 300 may be arranged at or near a bottom of the lower mast segment 211. The bottom clamp assembly 202 may comprise a bottom clamp 308 for selectively gripping a portion of the tower. A bottom clamp 308 may comprise one or more clamps which may be actively controlled for clamping (and thereby fixing the mast segment 211 in place with respect to the tower) and for releasing (such that mast segment 211 may move with respect to the tower). Clamps disclosed herein may include hydraulic or pneumatic or electric mechanisms for clamping. Any suitable clamp for firmly gripping, or grasping sufficiently tightly to maintain a hold of the portion of the tower may be used.

The bottom clamp assembly 202 may comprise a first arm 302 including a first clamp 308 arranged at a distal end of the first arm 302, and a second arm 304 including a second clamp arranged at a distal end of the second arm 304, and optionally wherein the first and the second arms 302, 304 are telescopic arms. A hydraulic actuator 306 may be arranged such that a segment of the arms can slide out of or back into another segment of hydraulic telescopic arm 302, 304.

The roller assembly 300 in this example comprises a first arm 340 including a first set of wheels 310 arranged at a distal end of the first arm 340, and a second arm 340 including a second set of wheels arranged at a distal end of the second arm 340. This may be seen in FIG. 5B.

The first and second arms 340 may be telescopic to vary a distance between rollers 315-318 and mast segment 211. A hydraulic mechanism (not illustrated) may be used to vary the length of telescopic arms 340. Tower segments may not be entirely cylindrical, and may e.g. be tapered with a decreasing diameter towards the top of a tower segment. E.g. a tower segment may be frustoconical, or partly conical. For example, in FIG. 4I, tower segment 175 may be seen to be conical, but this is merely an example.

In some examples (see e.g. FIGS. 5C and 5D), the first set of wheels 310 includes a first wheel support 330, wherein the first wheel support 330 is rotatable around a substantially vertical axis 342 with respect to the first arm 340. Rotation around vertical axis 342 enables varying a distance between sets of wheels 310. The roller assembly 300 can thereby adapt for varying diameters of tower segments.

Rotation around vertical axis 342 may be established by a pin extending through aligned holes of brackets mounted to arm 340 and wheel support 330.

In some examples, the first wheel support 330 may be rotatable around a substantially vertical axis 342 and around a substantially horizontal transverse axis 344 with respect to the first arm 340. Rotation around transverse axis 344 may be useful for conical tower segments such that upper wheels 315, 316 and lower wheels 317 and 318 can maintain contact with the tower.

Figure 5A:
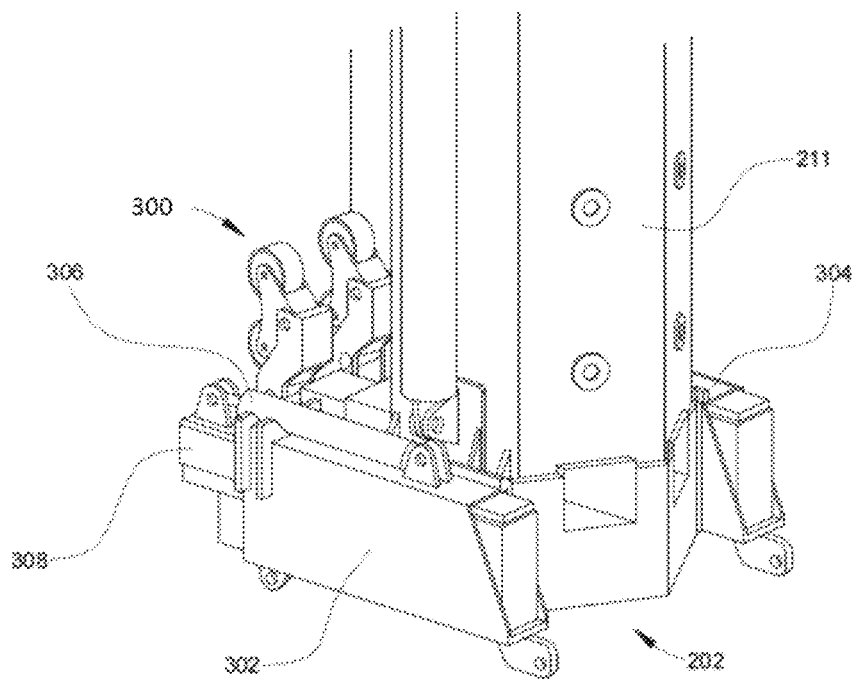
FIGS. 5A-5D schematically illustrate an example of a roller assembly that may form part of a crane according to examples of the present disclosure.
Figure 5B:
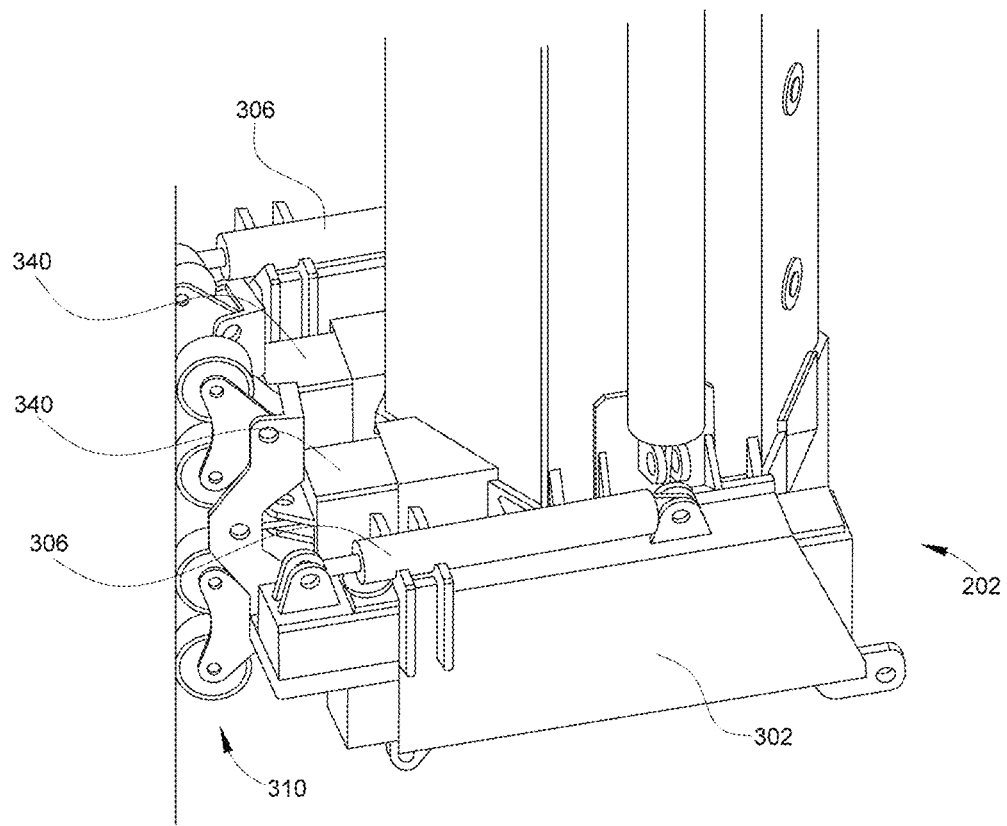
Figure 5C:
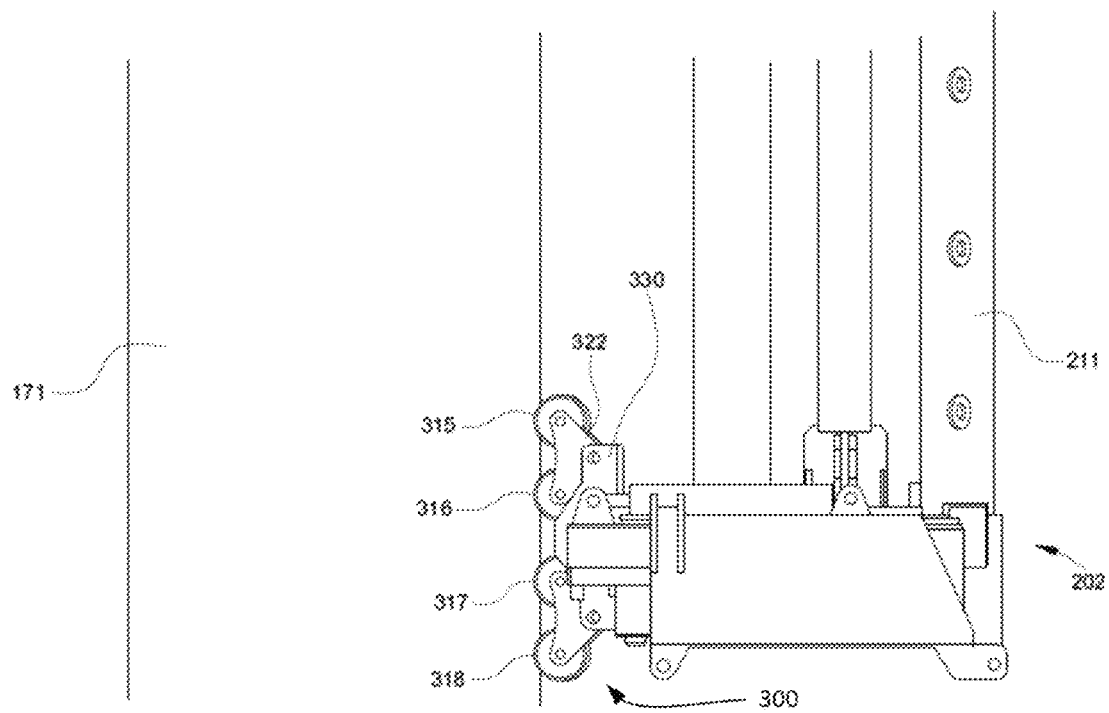
Figure 5D:
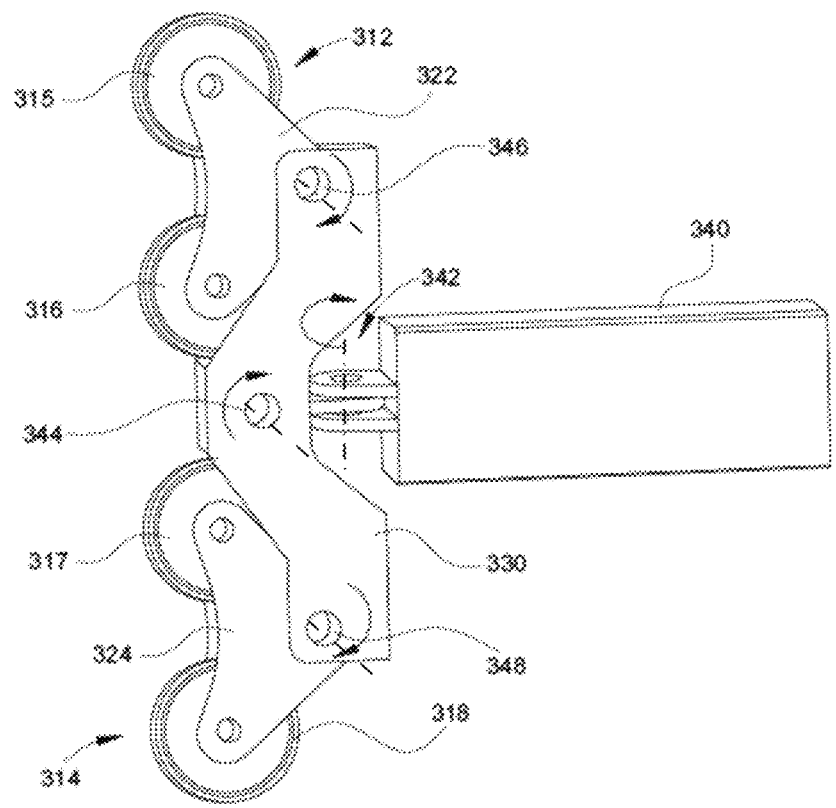

In the illustrated example, the roller assembly may further comprise an upper bracket 322 carrying an upper set 312 of wheels 315, 316, and a lower bracket 324 carrying a lower set 314 of wheels 317, 318. The upper and lower brackets 322, 324 are mounted on the first wheel support 330 and optionally the upper bracket 322 and the lower bracket 324 may be rotatably mounted with respect to the first wheel support 330. As illustrated in FIG. 5D, upper bracket 322 and lower bracket 324 may be rotatable about axes 346, 348 which may be substantially parallel to transverse axis 344 and substantially perpendicular to a longitudinal axis of first arm 340.

Rotation around axes 346 and 348 enables the wheels to adapt to e.g. flanges or other changes or irregularities along an outer surface of a tower, e.g. a wind turbine tower.

In the illustrated example, wheels 315-318 are shown. In other examples, different wheels, rollers or rolling bodies might be used.

Figure 6A:
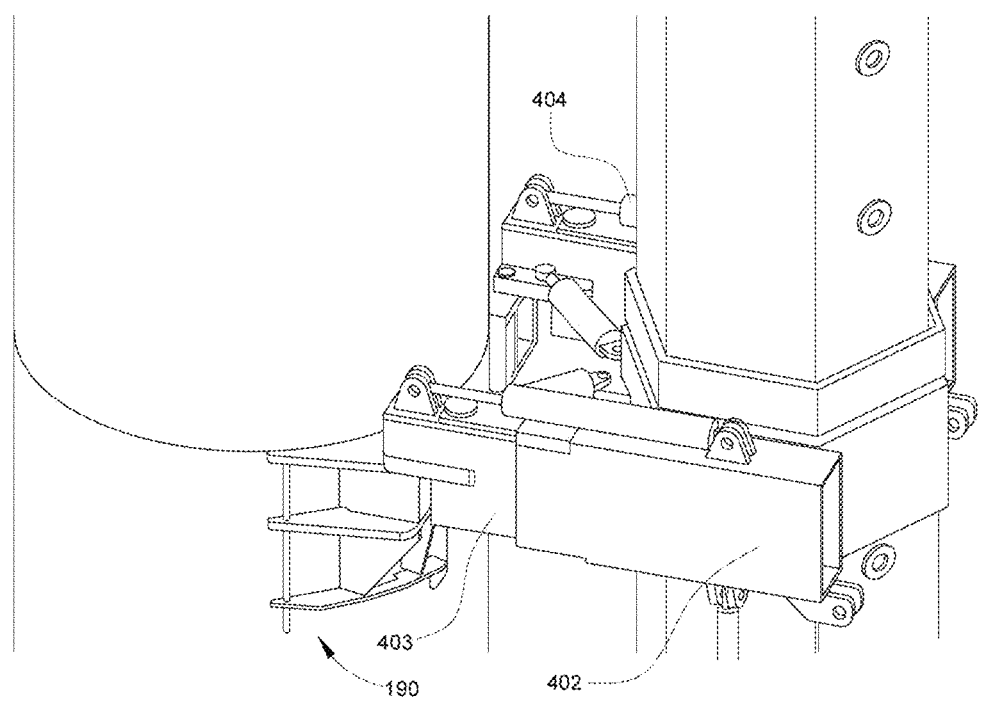
FIGS. 6A-6C schematically illustrate an example of a grip which may be used in examples of the present disclosure.
Figure 6B:
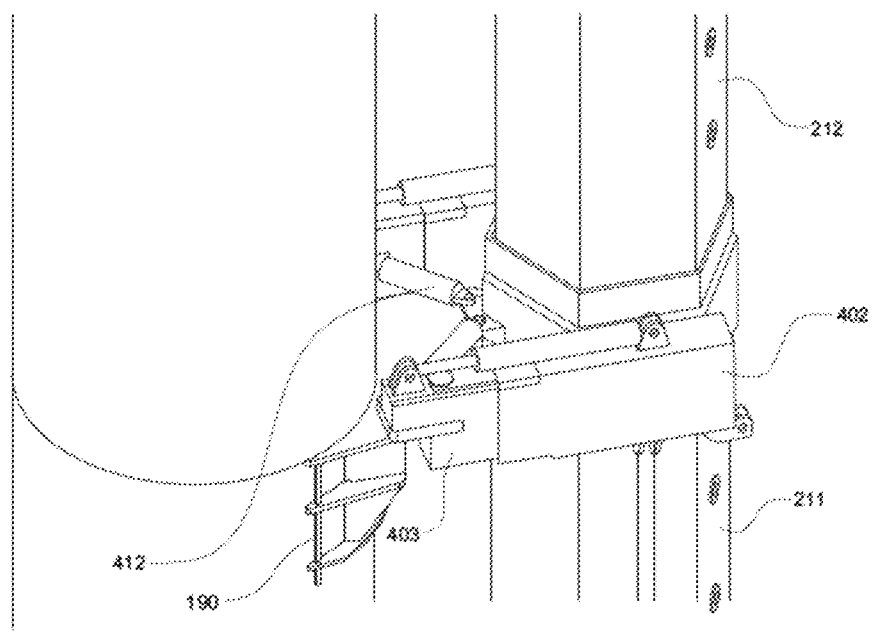
Figure 6C:
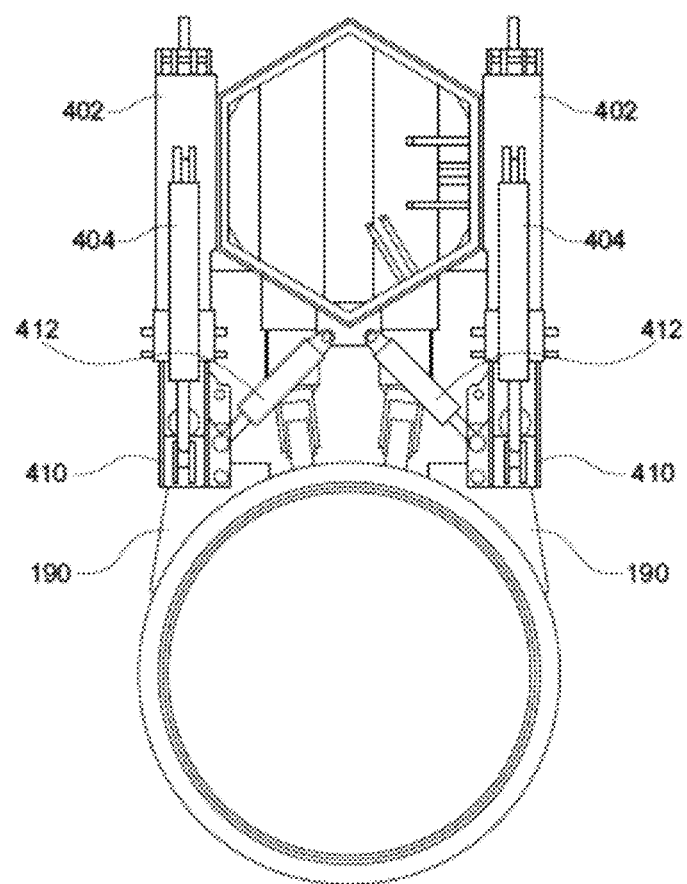

FIGS. 6A-6C schematically illustrate an example of a grip which may be used in examples of the present disclosure. In this particular example, intermediate clamp assembly 204 of lower mast segment 211 is shown, but similar arrangements and mechanisms may be provided for upper clamp assembly 206. Also, the bottom clamp assembly 202 may be the same or similar to the intermediate clamp assembly illustrated here.

One of the lower and the upper clamp assemblies 202, 204, 206 may comprise a first arm 402 including a first clamp 410 arranged at a distal end of the first arm 402, and a second arm 402 including a second clamp 410 arranged at a distal end of the second arm 402, and optionally wherein the first and the second arms 402 are telescopic arms. A hydraulic actuator 404 may be arranged such that segment 403 can slide out of or back into another segment of hydraulic telescopic arm 402. As before, a distance between telescopic mast and the clamps 410 may be varied to adjust to different diameters of different segments of a tower, such that mounts 190 may be reached even for the higher tower segments, and possibly tower segments varying in size and shape.

Illustrated in a bit more detail in FIG. 6A, is mount 190. Mount 190 may take any suitable form such that it can be gripped or clamped. The mount 190 may have the shape of a lug, pad, or plate. A plurality of plates or pads may be provided. The mounts 190 may be separately attached to tower segment or may be integrally formed therewith. In general, the mounts may be provided at or near the bottom end and the upper end of tower segments as may be seen in FIG. 4.

Generally speaking, loads may be lower during hoisting if a distance between the lower grip and the upper grip is increased. However, in accordance with a specific tower design and a specific telescopic mast, the situation of the mounts 190 may be varied.

In some examples, one or more of the clamp assemblies may be configured to change a distance between the first arm 402 and the second arm 402. In the illustrated example, hydraulic actuators 412 are shown which can adapt the distance between the arms.

In some examples, the assembly of arms 402 can pivot with respect to the mast segment. Loads between the arms and the corresponding mounts may be balanced using such a pivot. If the crane carries a load, and the jib is rotated with respect to the mast, the loads on the different mounts may become unbalanced. Pivoting may avoid or reduce such an unbalance.

Figure 7A:
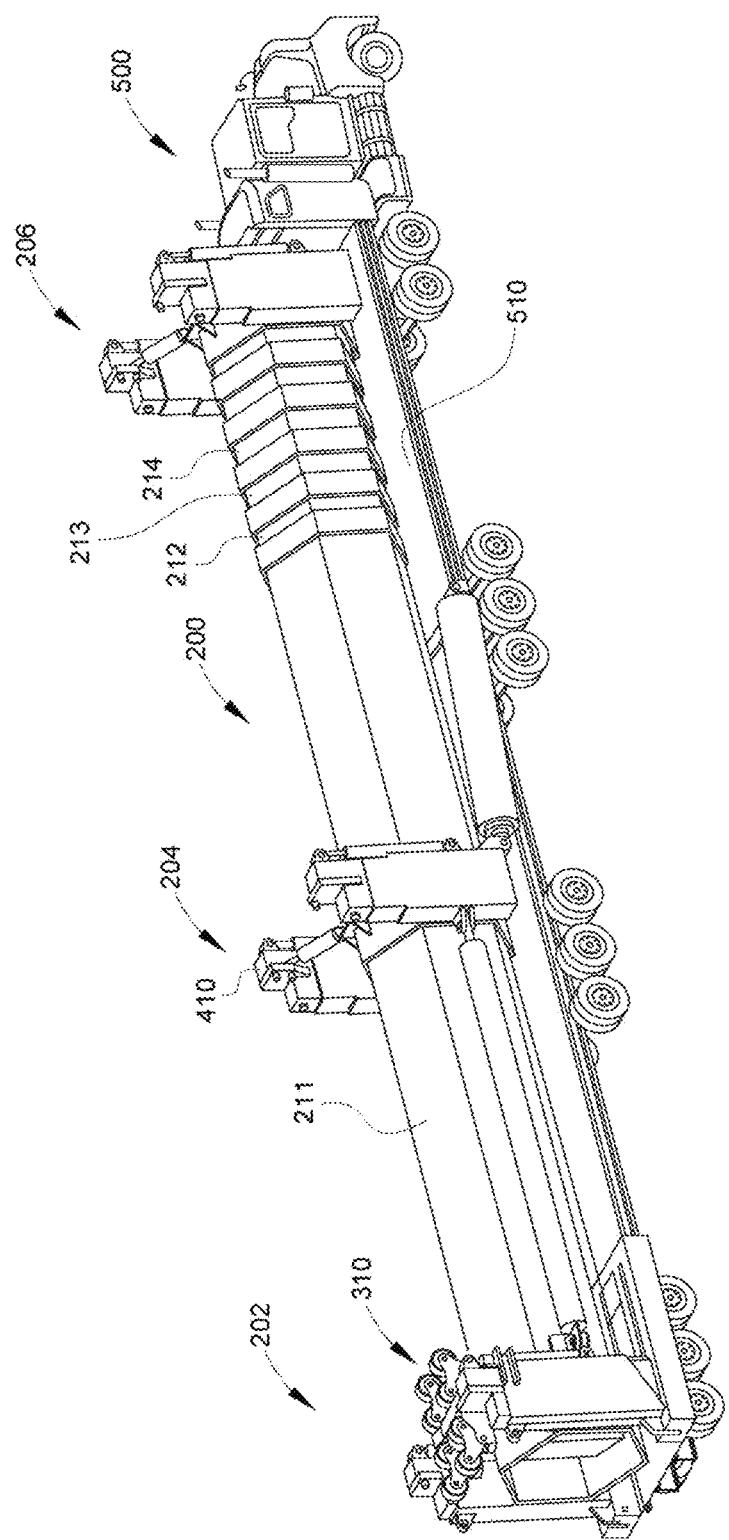
FIGS. 7A and 7B schematically illustrate an example of a method for erecting an example of a crane.
Figure 7B:
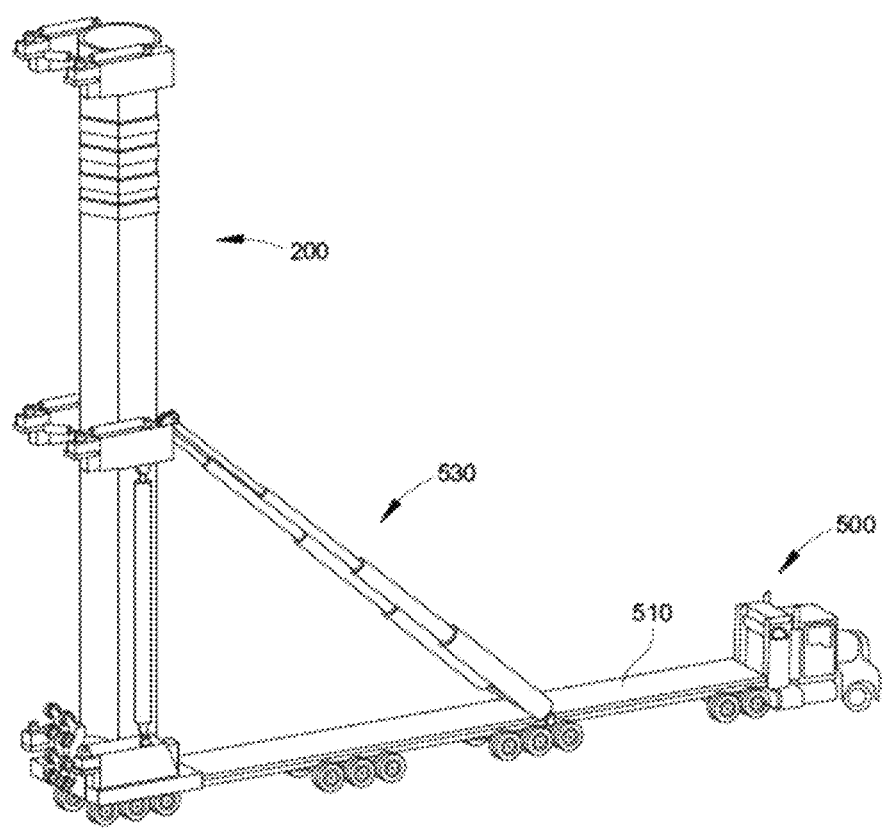

FIGS. 7A and 7B schematically illustrate an example of a method for erecting an example of a crane 200.

It may be seen that a mast may be transported separately from a jib. This can facilitate transport. The crane can be assembled on site.

A truck 500 may tow flatbed trailer 510. The telescopic mast of crane 200 may be arranged substantially horizontally i.e. lying on the trailer 510. The mast may be in the most retracted position for transport. In examples, a length of the telescopic mast may be 20 meters or less.

FIG. 7A shows the bottom clamp assembly 202 and roller assembly 300, intermediate clamp assembly 204 with clamps 410 and upper clamp assembly 206.

A bottom tower segment may previously have been positioned and installed on a suitable foundation. The mast may be brought in proximity with the tower segment. Using one or more hydraulic actuators 530, the mast may be brought up straight. The telescopic mast may pivot with respect to a rear end of the trailer 510.

Then, the bottom clamp assembly 202 and intermediate clamp assembly 204 may clamp portions of the bottom tower segment. In a subsequent step, the jib might be hoisted and put on top of the mast. After assembly of the jib with the telescopic mast, installation may be continued in accordance with other examples disclosed herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A crane and tower assembly for erecting a tower, comprising:
   a plurality of tower segments, wherein the tower segments each include one or more external mounts fixedly mounted in position thereon;
   a telescopic mast configured to change between a retracted state and one or more extended states;
   a jib rotatably mounted on the telescopic mast, the jib further comprising lifting equipment mounted thereon;
   the telescopic mast further comprising:
      a lower mast segment having a lower clamp assembly configured to partially encircle and selectively grip the mounts on the tower segments and a roller assembly configured to roll along the tower; and
      one or more additional mast segments having an upper clamp assembly configured to partially encircle and selectively grip the mounts on the tower segments, the additional mast segments being slidable with respect to the lower mast segment.

2. The crane and tower assembly according to claim 1, wherein the telescopic mast is configured to climb the tower by selectively releasing the upper clamp assembly or the lower clamp assembly and changing between the retracted and the extended states.

3. The crane and tower assembly according to claim 1, wherein the additional mast segments comprise an upper mast segment and one or more intermediate mast segments.

4. The crane and tower assembly according to claim 3, wherein the upper clamp assembly is mounted to the upper mast segment.

5. The crane and tower assembly according to claim 1, wherein one or both of the upper clamp assembly and the lower clamp assembly comprise:
   a first arm with a first clamp arranged at a distal end of the first arm; and
   a second arm including a second clamp arranged at a distal end of the second arm.

6. The crane and tower assembly according to claim 5, wherein a distance between the first arm and the second arm is changeable.

7. The crane and tower assembly according to claim 1, wherein the lower clamp assembly comprises a bottom clamp assembly and an intermediate clamp assembly that selectively grip portions of the tower.

8. The crane and tower assembly according to claim 1, wherein the roller assembly comprises a first arm with a first set of wheels arranged at a distal end of the first arm, and a second arm with a second set of wheels arranged at a distal end of the second arm.

9. A method for climbing a tower with the crane and tower assembly according to claim 1, the method comprising:
   positioning a first tower segment of the plurality of tower segments;
   attaching the crane having the telescopic mast to the first tower segment by gripping the mount on an outside of the first tower segment with the lower clamp assembly on the telescopic mast;
   with the crane, stacking one or more additional tower segments of the plurality of tower segments on top of the first tower segment;
   with the upper clamp assembly of the telescopic mast, gripping on an outside of one of the additional tower segments;
   releasing the lower clamp assembly; and
   retracting the telescopic mast from an at least partially extended state, whereby the roller assembly of a lower mast segment of the telescopic mast rolls along an outside of the first tower segment.

10. The method of claim 9, further comprising gripping the mount on the outside of one of the additional tower segments with the lower clamp assembly of the telescopic mast.

11. The method of claim 9, wherein the stacking one or more additional tower segments on top of the first tower segment comprises lifting one of the additional tower segments with the lifting equipment.

12. The method of claim 9, further comprising releasing the upper clamp assembly of the telescopic mast from the additional tower segment, extending the telescopic mast, and gripping another mount on an outside of another one of the additional tower segments.

13. A crane for erecting a tower from a plurality of tower segments, the crane comprising:
   a telescopic mast configured to change between a retracted state and one or more extended states;
   a jib rotatably mounted on the telescopic mast, the jib further comprising lifting equipment mounted thereon;
   the telescopic mast further comprising:
      a lower mast segment having a lower clamp assembly configured to grip the tower and a roller assembly configured to roll along the tower;
      one or more additional mast segments having an upper clamp assembly for selectively gripping portions of the tower, the additional mast segments being slidable with respect to the lower mast segment;
      the roller assembly comprising a first arm with a first set of wheels arranged at a distal end of the first arm, and a second arm with a second set of wheels arranged at a distal end of the second arm; and
      wherein the first set of wheels comprises a first wheel support that is rotatable around a vertical axis with respect to the first arm.

14. The crane according to claim 13, wherein the first wheel support is rotatable around a horizontal transverse axis with respect to the first arm.

15. The crane according to claim 13, wherein:
   the roller assembly further comprises an upper bracket carrying an upper set of wheels, and a lower bracket carrying a lower set of wheels; and the upper and lower brackets mounted on the first wheel support.

\* \* \* \* \*